(12) United States Patent
Kondo et al.

(10) Patent No.: US 11,305,912 B2
(45) Date of Patent: Apr. 19, 2022

(54) PALLET

(71) Applicant: TOHO INDUSTRIES CO., LTD, Osaka (JP)

(72) Inventors: Daisuke Kondo, Osaka (JP); Toru Oda, Osaka (JP); Toru Ibayashi, Osaka (JP); Hironori Nitta, Osaka (JP); Daichi Fukasawa, Osaka (JP)

(73) Assignee: TOHO INDUSTRIES CO., LTD, Osaka (JP)

( * ) Notice: Subject to any disclaimer, the term of this patent is extended or adjusted under 35 U.S.C. 154(b) by 248 days.

(21) Appl. No.: 16/630,590

(22) PCT Filed: Sep. 12, 2019

(86) PCT No.: PCT/JP2019/035940
§ 371 (c)(1),
(2) Date: Jan. 13, 2020

(87) PCT Pub. No.: WO2021/048979
PCT Pub. Date: Mar. 18, 2021

(65) Prior Publication Data
US 2021/0403200 A1    Dec. 30, 2021

(51) Int. Cl.
*B65D 19/00*    (2006.01)
*B29C 51/10*    (2006.01)
(Continued)

(52) U.S. Cl.
CPC .......... *B65D 19/0028* (2013.01); *B29C 51/10* (2013.01); *B29C 51/36* (2013.01);
(Continued)

(58) Field of Classification Search
CPC ...... B65D 19/0028; B65D 2519/00034; B65D 2519/00338; B29C 51/36
See application file for complete search history.

(56) References Cited

U.S. PATENT DOCUMENTS

| | | | |
|---|---|---|---|
| 6,997,113 B1 * | 2/2006 | Harding | B65D 19/0028 108/53.1 |
| 10,266,303 B1 * | 4/2019 | Kownacki | B32B 3/08 |
| 2003/0079657 A1 * | 5/2003 | Preisler | B65D 19/0018 108/51.3 |

FOREIGN PATENT DOCUMENTS

| | | |
|---|---|---|
| JP | 2003-072754 A | 3/2003 |
| JP | 2007-176534 A | 7/2007 |
| WO | WO-2011040758 A2 * | 4/2011 ......... B65D 19/0018 |

OTHER PUBLICATIONS

International Search Report and Written Opinion for corresponding Application No. PCT/JP2019/35940, dated Dec. 17, 2019.

* cited by examiner

*Primary Examiner* — Daniel J Rohrhoff
(74) *Attorney, Agent, or Firm* — Renner, Otto, Boisselle & Sklar, LLP (57) ABSTRACT

A pallet having excellent thermal insulation performance and cushioning property with respect to goods-conveyed while ensuring the strength of the outer surface of the pallet. The pallet includes a plate-like pallet body made of foamed resin, the plurality of legs provided on the bottom surface of the pallet body, and the resin sheet integrated from the bottom surface side of the pallet body by vacuum-forming. Further, the top surface of the pallet body includes the loading surface on which goods-conveyed are placed, and the step portion formed in a shape down-step from the outer peripheral edge of the loading surface to the side surface of the pallet body. The resin sheet covers the bottom surface of the pallet body, the legs, the side surface and the step portion of the pallet body, and the loading surface is not covered with the resin sheet.

7 Claims, 10 Drawing Sheets

(51) Int. Cl.
*B29C 51/36* (2006.01)
*B29L 31/00* (2006.01)

(52) U.S. Cl.
CPC .............. *B29L 2031/7178* (2013.01); *B65D 2519/00034* (2013.01); *B65D 2519/00069* (2013.01); *B65D 2519/00338* (2013.01)

PALLET

FIELD OF THE INVENTION

The present invention relates to a pallet made of foamed resin, such as expanded polystyrene, used for transporting goods using a forklift, a hand-drawn pallet jack or the like.

DESCRIPTION OF THE RELATED ART

Conventionally, various pallets have been widely used as goods carrying platforms when carrying goods by forklifts or hand-drawn pallet jacks. For example, when transporting goods by a forklift or the like at a logistics site, the goods are loaded on a loading surface of the pallet, the fork of the forklift is inserted into the fork insertion port on the side of the pallet, and the pallet is lifted to a predetermined height position. After conveying the pallet to a destination by operating the forklift, the fork is lowered, the pallet is placed on the destination, and the fork is extracted from the fork insertion port.

As general pallets, wooden, plastic, metal (iron alloy) or paper pallets are known. However, each of many common pallets has large weight, for example, the wooden pallet weighs 10 kg or more, and even though the paper pallet is lighter than the plastic or metal pallet, such a paper pallet has a considerable weight because it is made through compression forming to have high density to ensure its shape stability.

Related to the above, a pallet made of foamed resin is known as a lighter pallet than the paper pallet (see, for example, Patent Document 1). However, the pallet made of foamed resin has fine irregularities on the surface due to the foamed beads, and there is a problem that the surface is fragile and rough compared to a pallet made of wood or plastic. Then, such a resin pallet that the surface of the pallet body is covered with a resin sheet for reinforcement is known (for example, refer Patent Document 2).

PRIOR ART DOCUMENTS

Patent Documents

Patent Document 1: Japanese Laid-Open Patent Publication 2003-072754
Patent Document 2: Japanese Laid-Open Patent Publication 2007-176534

The foamed beads, which constitute the foamed resin pallet, contain air in their almost entire volume, and therefore have low thermal conductivity and moderate elasticity. Therefore, the pallet made of foamed resin has a thermal insulation performance that makes it difficult for heat from a road surface, a warehouse floor, etc. to be transferred to the pallet, and also since the pallet made of foamed resin has a cushioning property unique to foamed resin, goods-conveyed can be protected from shocks.

However, since the resin sheet has higher thermal conductivity than the foamed beads, heat is easily transferred to the goods-conveyed when the resin sheet is in direct contact with the goods-conveyed. Therefore, as shown in the above-mentioned Patent Document 1, although the pallet whose entire surface is covered with a resin sheet is superior in thermal insulation performance and cushioning property than the conventional plastic pallet, however, as compared with those not covered with the resin sheet, there is a possibility that the advantageous functions inherent in the foamed resin such as the above-described high thermal insulation performance and cushioning property cannot be sufficiently exhibited.

The present invention has been made in view of the above problems, and an object of the present invention is to provide a pallet having excellent thermal insulation performance and cushioning property with respect to loaded goods-conveyed while ensuring the strength of the outer surface of the pallet.

SUMMARY OF THE INVENTION

In order to solve the above problems, the present invention provides a pallet comprising: a plate-like pallet body made of foamed resin; a plurality of legs provided on a bottom surface of the pallet body; and a resin sheet integrated by vacuum-forming from the bottom surface side of the pallet, wherein a top surface of the pallet body has a loading surface on which goods-conveyed is placed, and a step portion formed in a shape down-step from the outer peripheral edge of the loading surface to the side surface of the pallet body, and the resin sheet covers the bottom surface of the pallet body, the legs, the side surfaces of the pallet body and the step portion, and the loading surface is not covered with the resin sheet.

In the pallet, it is preferable that the resin sheet has a thin sheet thickness at a portion covering the step portion.

In the pallet, it is preferable that the pallet body and the legs are molded as separate bodies, and the bottom surface of the pallet body has an exhaust hole made in a thickness direction of the pallet body at a place where the leg is arranged.

In the pallet, it is preferable that the bottom surface of the pallet body has a fitting concave into which the leg is fitted, and the exhaust hole is provided at a peripheral edge of the fitting concave.

In the pallet, it is preferable that the exhaust hole does not penetrate to the top surface of the pallet body, and a thickness of 5 mm or more is provided from a bottom of the exhaust hole to the top surface of the pallet body.

In the pallet, it is preferable that a ridge line portion between the step portion and the loading surface is chamfered to be a curved surface.

In the pallet, it is preferable that the loading surface is an exposed surface of the foamed resin forming the pallet body and having a thermal insulation performance and a cushioning property.

According to the pallet of the present invention, since the resin sheet covers surfaces that are particularly susceptible to damage, such as the bottom surface of the pallet body, the places between the legs into which the fork are inserted, and the side surface of the pallet body, those outer surfaces can be strengthened. Moreover, since the loading surface of the pallet is not covered with the resin sheet, the foamed resin having the thermal insulation performance and cushioning property and forming the pallet body is exposed there. In other words, the foamed resin constituting the foamed resin pallet can contact directly with the goods placed on the pallet so as to be conveyed, and therefore it is possible to enjoy the high thermal insulation performance and the cushioning property unique to the foamed resin.

DETAILED DESCRIPTION

Figure 1A:
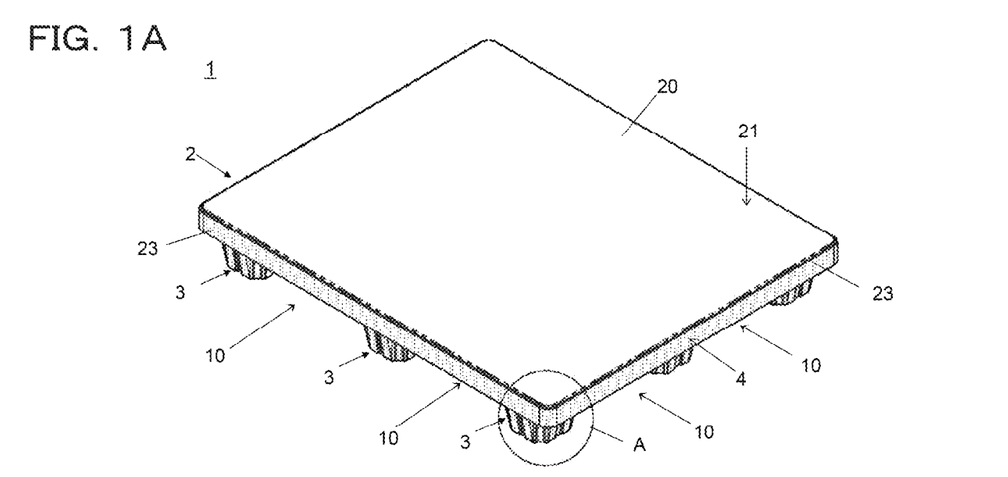
FIG. 1A is a perspective view mainly showing an top surface of a pallet according to an embodiment of the present invention.
Figure 1B:
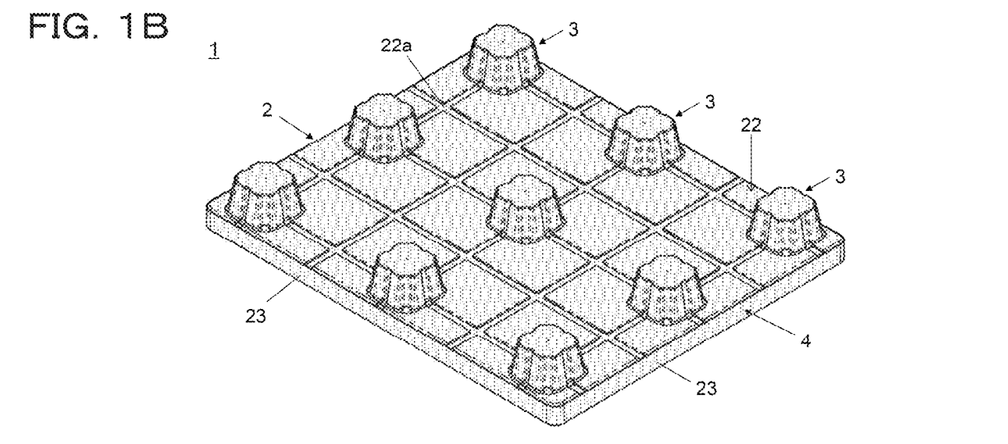
FIG. 1B is a perspective view mainly showing a bottom surface of the pallet.
Figure 1C:
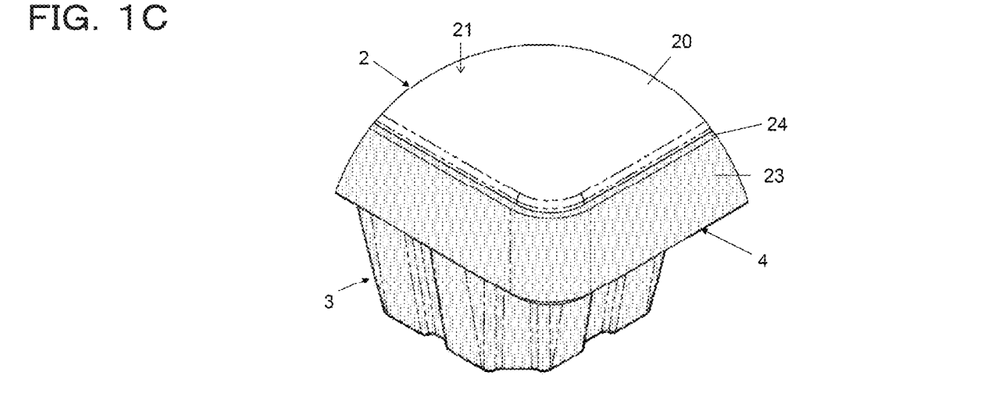
FIG. 1C is a enlarged view of the region A in FIG. 1A.

A pallet according to an embodiment of the present invention will be described with reference to the drawings. As shown in FIG. 1A to FIG. 1C, FIG. 2, FIG. 3A to FIG. 3C and FIG. 4A and FIG. 4B, the pallet 1 of this embodiment can be preferably used for the management and transportation of goods using a forklift, a hand-drawn pallet jack or the like at a distribution site or the like. In the following description, the left front side of the pallet 1 shown in FIG. 1A is referred to as the front, and the right front side of the pallet 1 is referred to as the right side.

Figure 2:
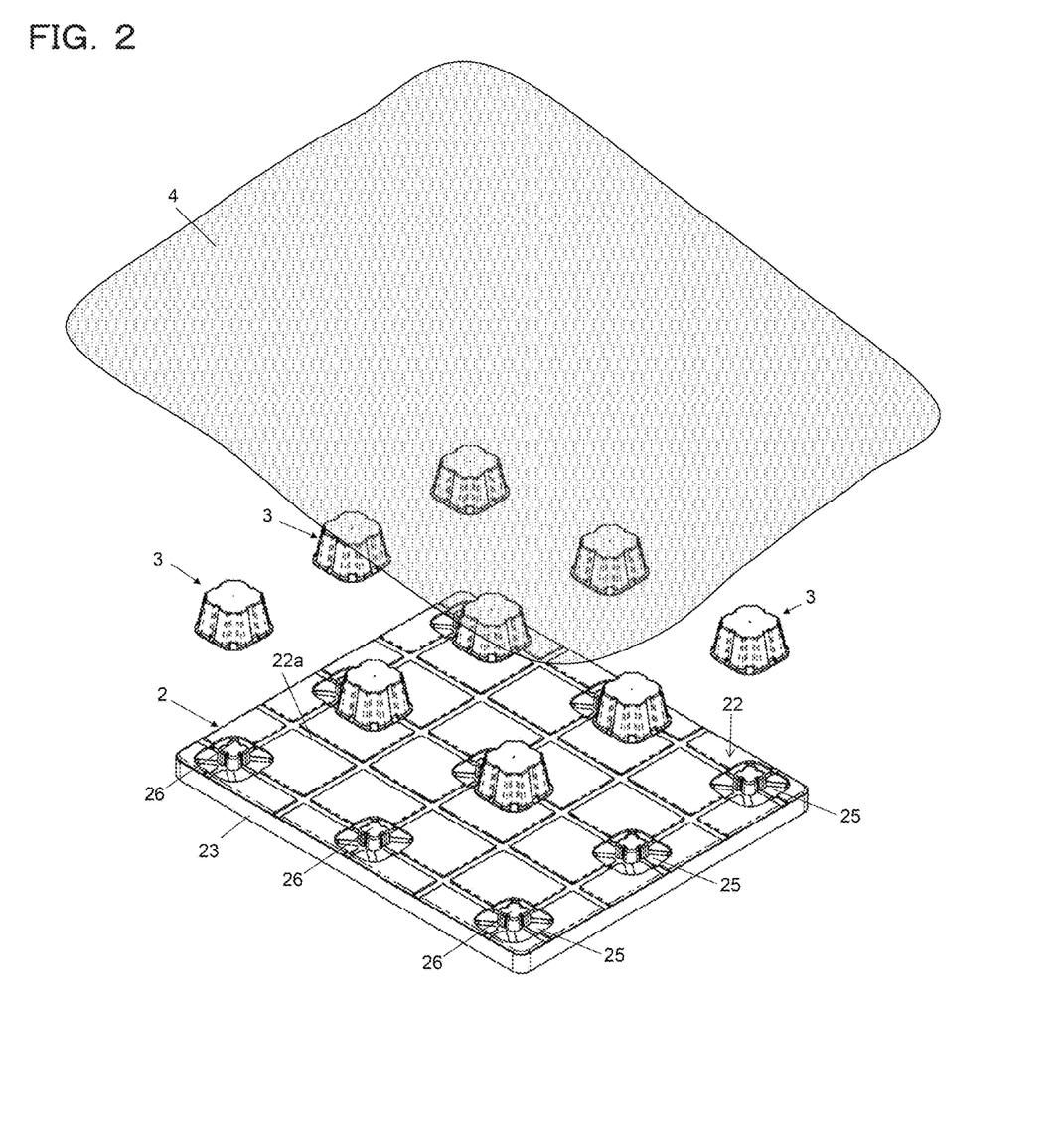
FIG. 2 is an exploded perspective view mainly showing the bottom surface of the pallet.
Figure 3A:
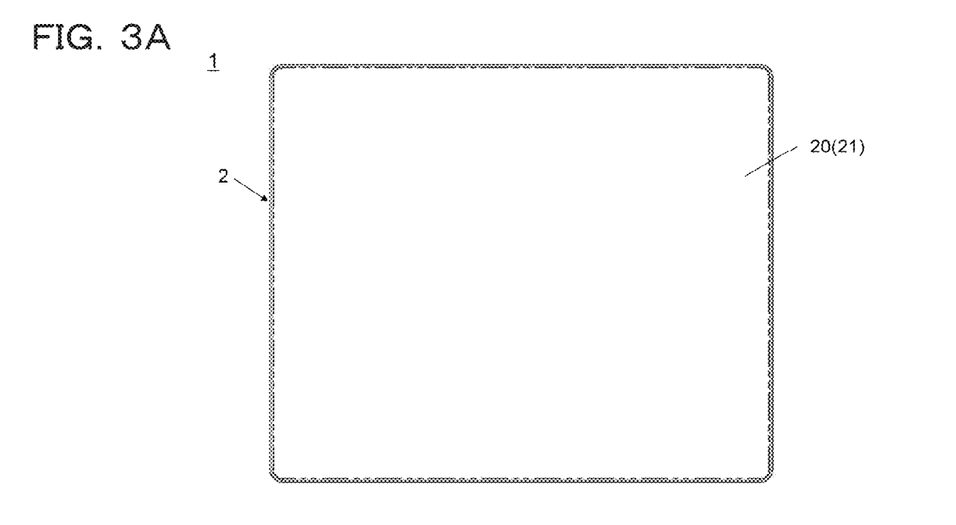
FIG. 3A is a plan view of the pallet.
Figure 3B:
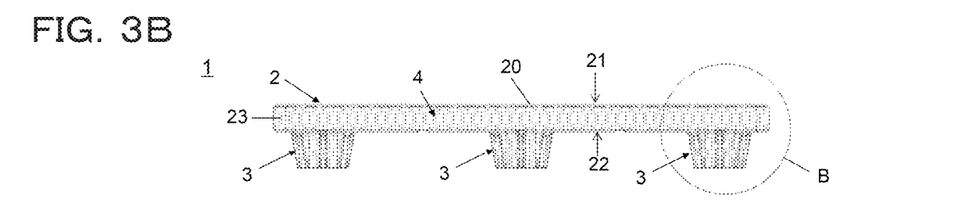
FIG. 3B is a side view.
Figure 3C:
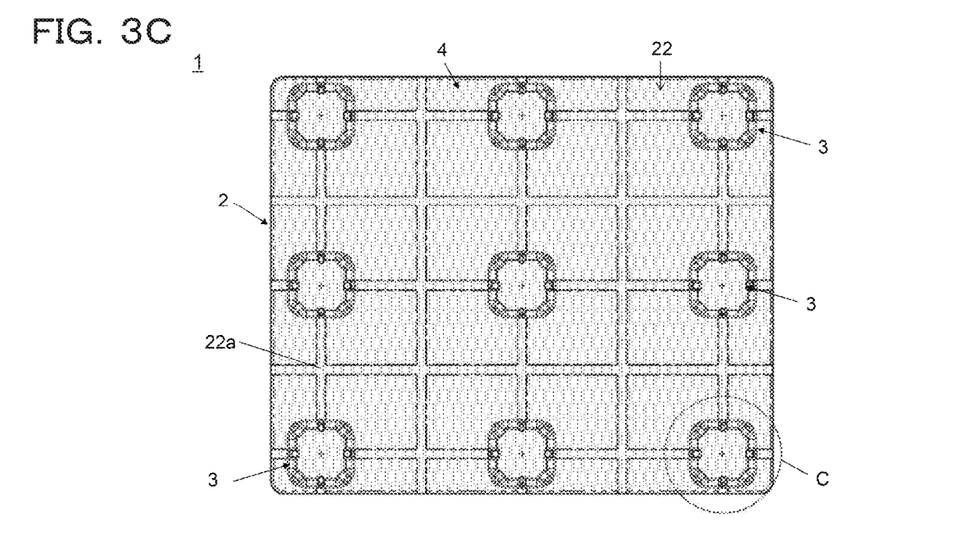
FIG. 3C is a bottom view.

The pallet 1 comprises a plate-like pallet body 2 made of foamed resin, a plurality of legs 3 provided on the bottom surface of the pallet body 2, and a resin sheet 4 that covers the outer surfaces of the pallet body 2 and the legs 3 (see FIG. 2). The plurality of legs 3 are arranged in a lattice pattern at predetermined intervals on the bottom surface of the pallet body 2. In this example, nine legs 3 of 3×3 are provided, each of which has a box-like shape with a substantially square projected area in plan view. In the illustrated example, the resin sheet 4 is shown in gray for convenience of explanation, but the resin sheet 4 may be transparent or the same white as the pallet body 2.

The leg 3 is a support member that raises the height of the top surface 21 serving as the loading surface 20, and the plurality of legs 3 are arranged at predetermined intervals from the adjacent legs 3, thereby the fork insertion portion 10 into which a fork is inserted is formed (FIG. 1A). In this example, the structure of the pallet 1 of so-called four-way insertion is shown, in which the fork insertion portion 10 is formed between the legs 3 on both sides and the legs 3 on center, and the fork insertion portions are opened on four sides, namely, left, right, front and back sides, thus four insertion directions are available. In addition, for example, legs each of which has a long box-like shape with a substantially rectangular projected area in plan view may be provided in a three-row arrangement, and so-called two-way insertion may be possible.

The pallet body 2 and the legs 3 are molded as separate parts. The material constituting the pallet body 2 is, for example, a foamed synthetic resin such as a polyolefin-based resin such as polystyrene, polyethylene, or polypropylene, and in the present embodiment, foamed polystyrene (EPS: expanded polystyrene) is used. The material constituting the legs 3 is preferably the same as that of the pallet body 2, but a material different in density and hardness from the pallet body 2 may be used, or another material may be used.

Figure 4A:
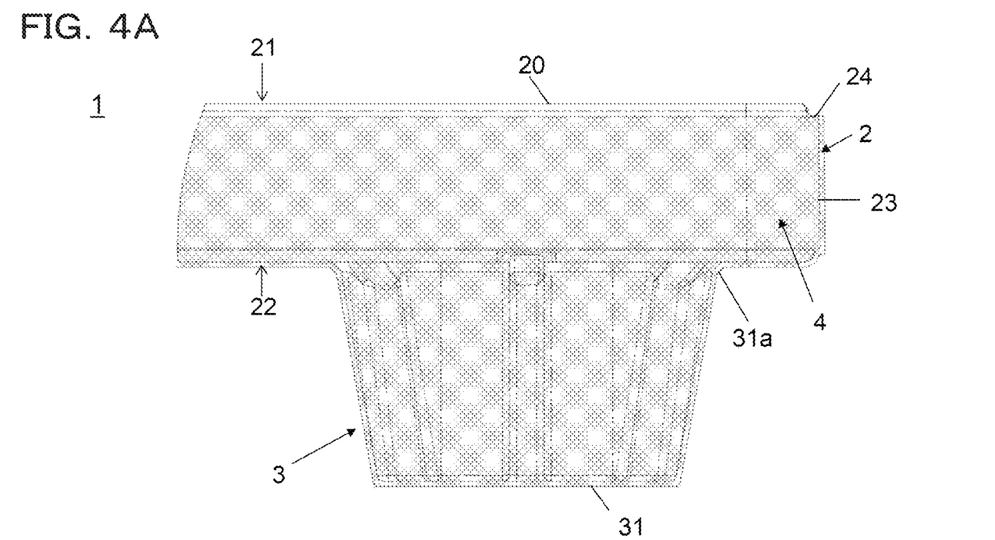
FIG. 4A is an enlarged view of the region B in FIG. 3B.
Figure 4B:
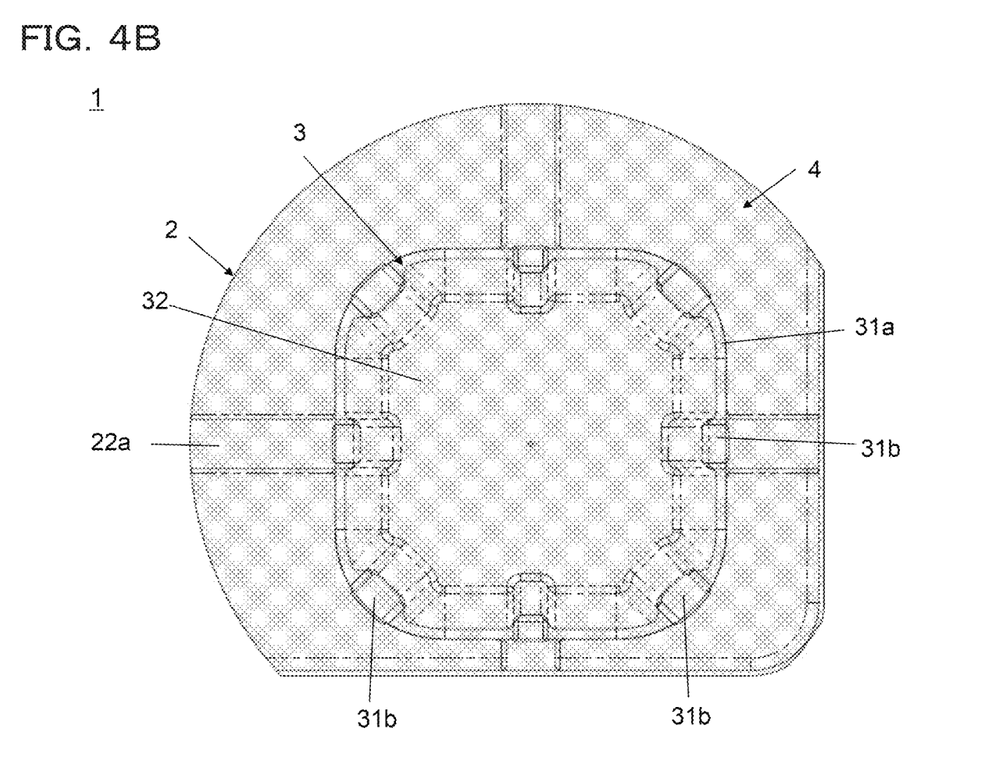
FIG. 4B is the enlarged view of the region C in FIG. 3C.
Figure 5A:
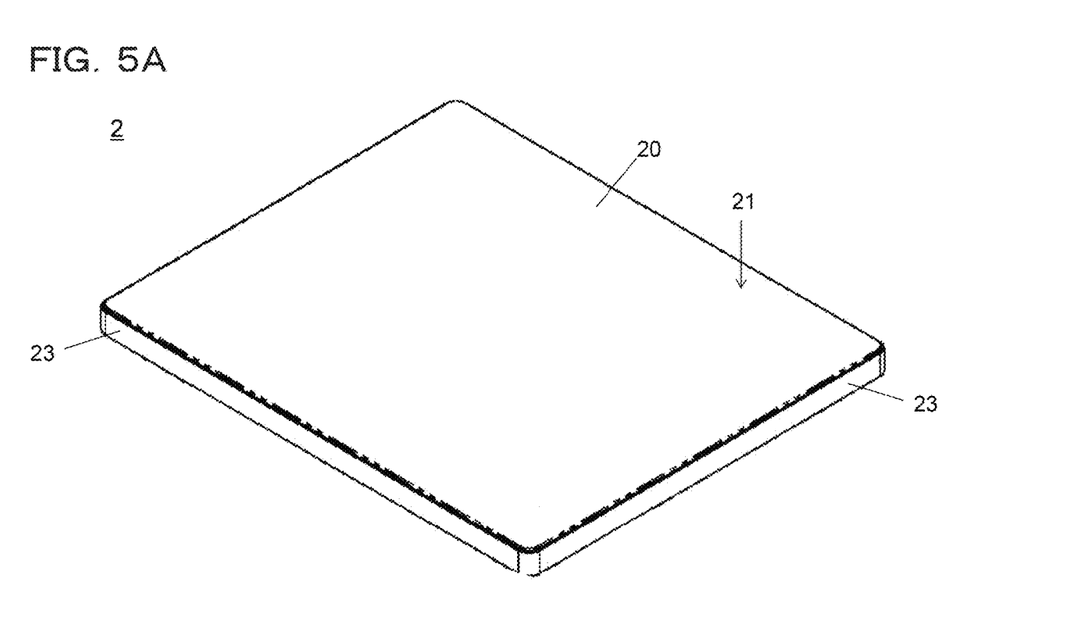
FIG. 5A is a perspective view mainly showing the top surface of a pallet body used in the pallet.
Figure 5B:
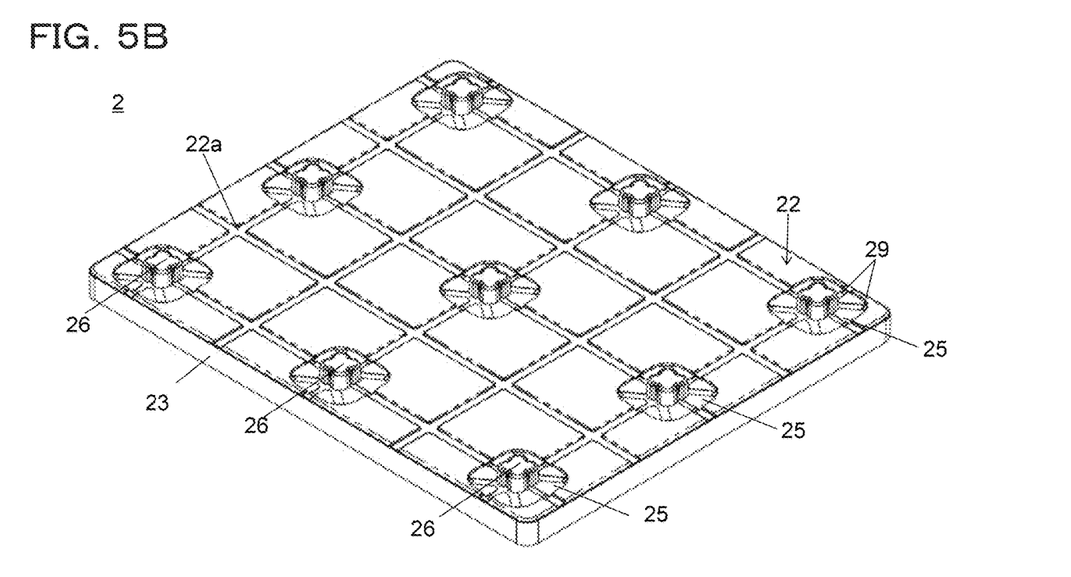
FIG. 5B is a perspective view mainly showing a bottom surface of the pallet body.

As shown in FIG. 4A and FIG. 4B, the resin sheet 4 covers the bottom surface 22 of the pallet body 2, the legs 3, the side surface 23 of the pallet body 2, and a step portion described later. Since the legs 3 are covered with the resin sheet 4 together with the bottom surface 22 of the pallet body 2, they are more firmly fixed to the pallet body 2.

Figure 6A:
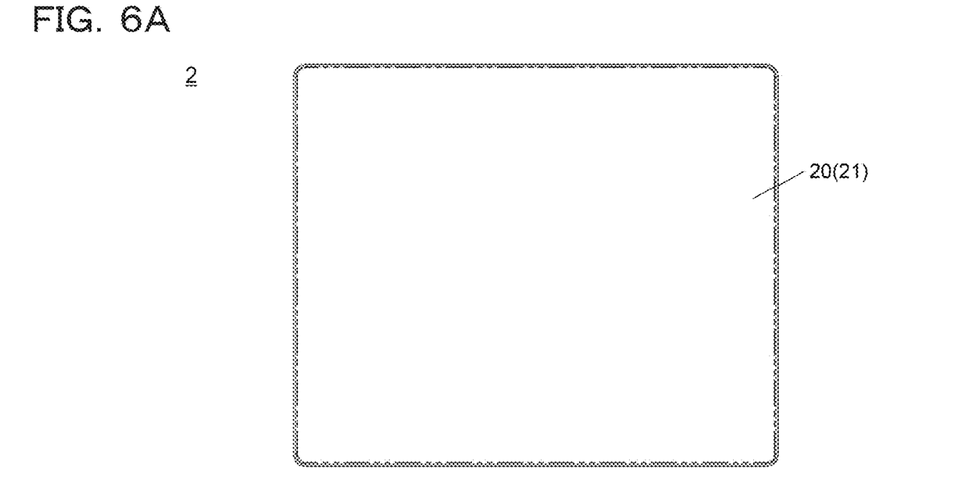
FIG. 6A is a plan view of the pallet body.
Figure 6B:
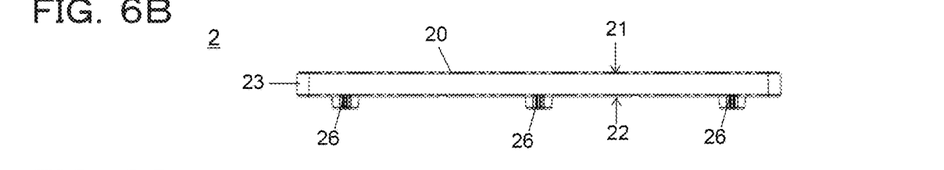
FIG. 6B is a front view.
Figure 6C:
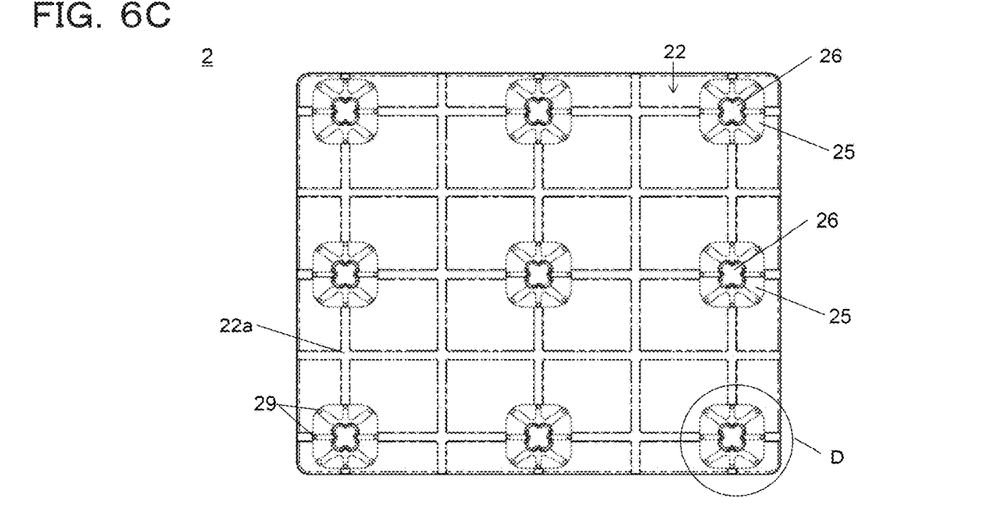
FIG. 6C is a bottom view.
Figure 6D:
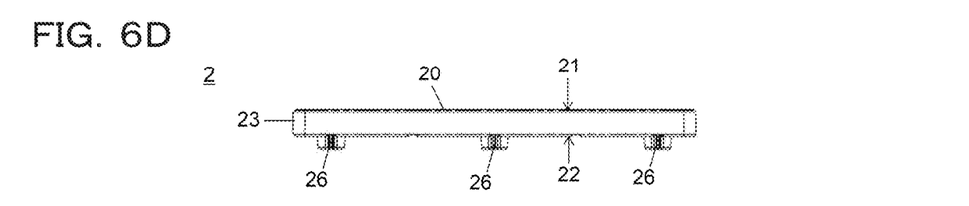
FIG. 6D is a side view.

As shown in FIG. 5A and FIG. 5B and FIG. 6A and FIG. 6D, the pallet body 2 is a plate-like member having a predetermined thickness and having a rectangular shape in plan view. The pallet body 2 of the present example is formed so that the width on the front side (FIG. 6B) is slightly larger than the width on the side surface (FIG. 6D), but this is not limitative, instead, the shape of the pallet body 2 may be appropriately selected from various shapes including a polygonal shape in plan view. The pallet body 2 comprises the top surface 21 having a loading surface 20 on which goods is loaded, the bottom surface 22 on which the legs 3 are provided, and the side surface 23 connecting the top surface 21 and the bottom surface 22. The outer dimensions of the top surface 21 and the bottom surface 22 are substantially equal, and the corners made of the side surfaces 23 are chamfered so as to be rounded (see also FIG. 1C).

On the top surface 21 of the pallet body 2, the step portion 24 is provided, which is formed in a shape down-step from the outer peripheral edge of the loading surface 20, on which the goods-conveyed is placed, to the side surface 23 of the pallet body 2 (see FIG. 4A). The step portion 24 is formed in a region having a width of about 1 to 15 mm from the outer peripheral edge (ridge line portion with the side surface 23) of the top surface 21 toward the inside. When the width of the step portion 24 is too large, the loading surface 20 becomes unnecessarily narrow, and when the width of the step portion 24 is too small, the resin sheet 4 becomes insufficiently wound as described later. Further, the depth of the step portion 24 (step difference from the loading surface 20) is preferably 2 to 15 mm. If the step portion 24 is too shallow, the resin sheet 4 may not accurately cover the step portion 24, and if the step portion 24 is too deep, surface strength will decrease, because exposed area of the foamed resin in the peripheral edge portion of the loading surface 20 increases. The ridge line portion between the step portion 24 and the loading surface 20 is chamfered so as to be a curved surface (see also FIG. 7B).

The surface of the bottom surface 22 of the pallet body 2 is provided with the grooves 22a formed in a lattice shape in order to prevent the inserted fork from slipping. Further, the bottom surface 22 of the pallet body 2 has the fitting concaves 25 in which the legs 3 are fitted. Each of the fitting concaves 25 is formed so that its inner dimension is substantially equal to the outer dimension of the top surface (joint surface 31) of the leg 3.

Figure 7A:
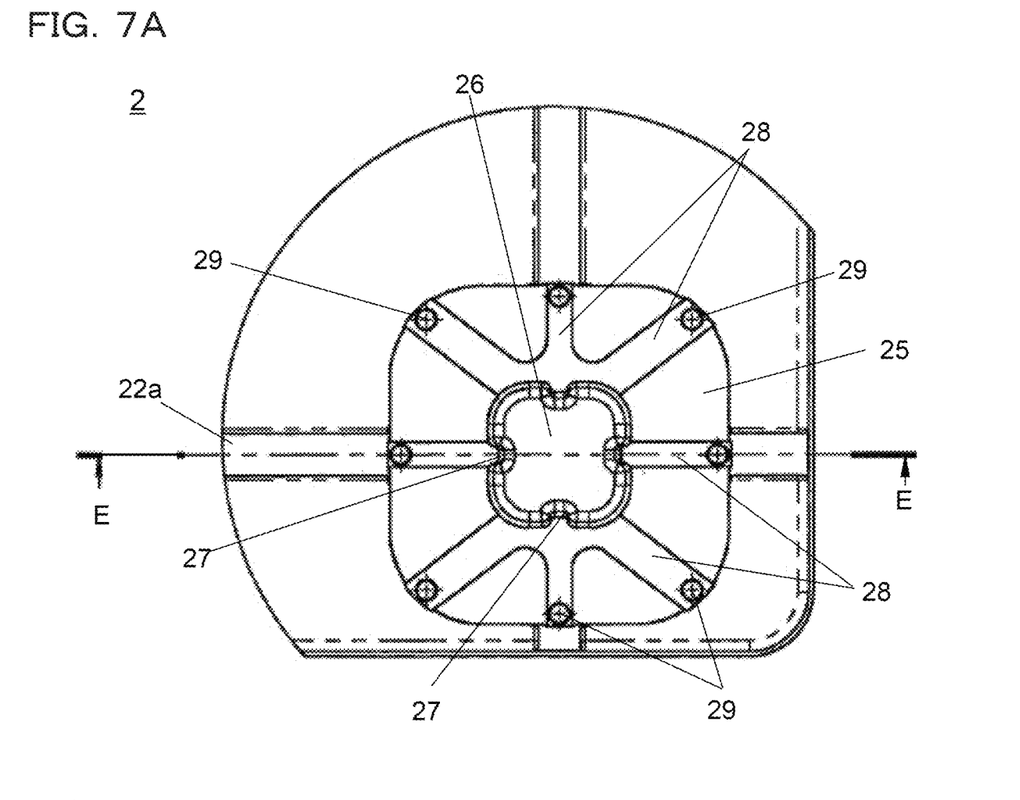
FIG. 7A is an enlarged view of the region D in FIG. 6C.
Figure 8A:
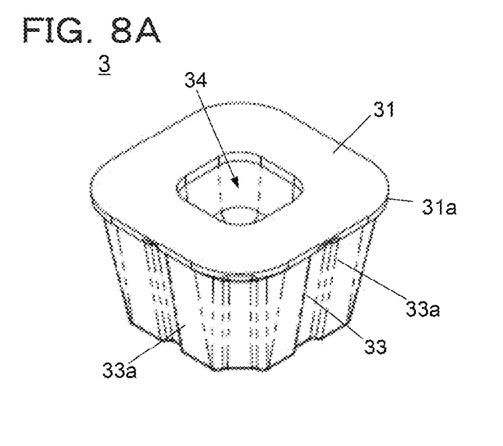
FIG. 8A is a perspective view mainly showing the top surface of the leg used in the pallet.
Figure 8B:
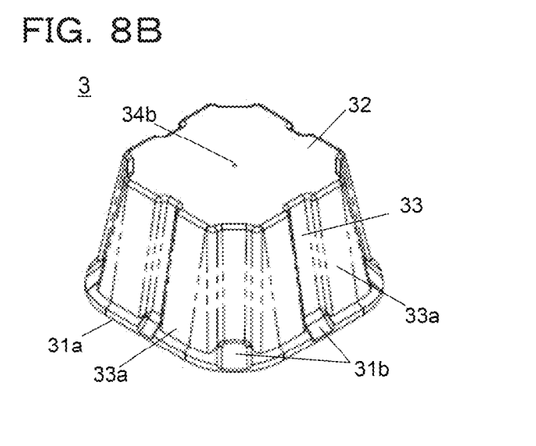
FIG. 8B is a perspective view mainly showing the bottom surface of the leg.
Figure 8C:
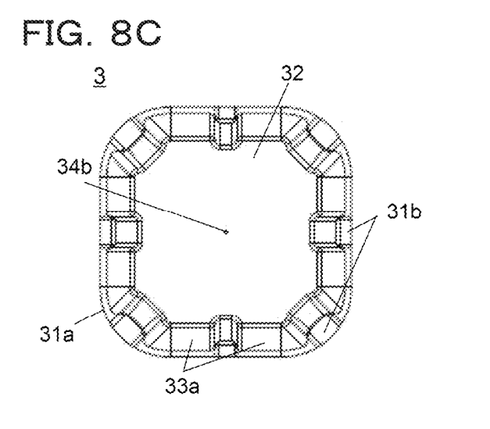
FIG. 8C is a bottom view of the leg.
Figure 8D:
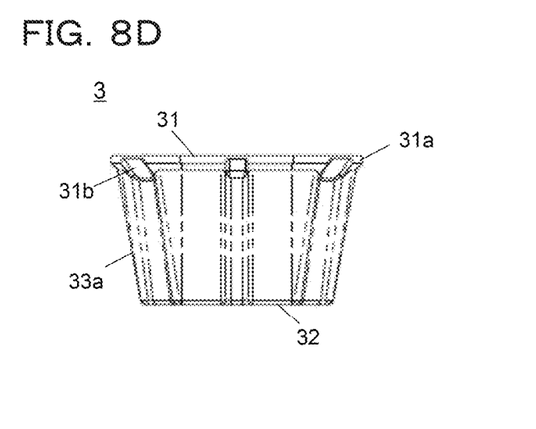
FIG. 8D is a side view.
Figure 8E:
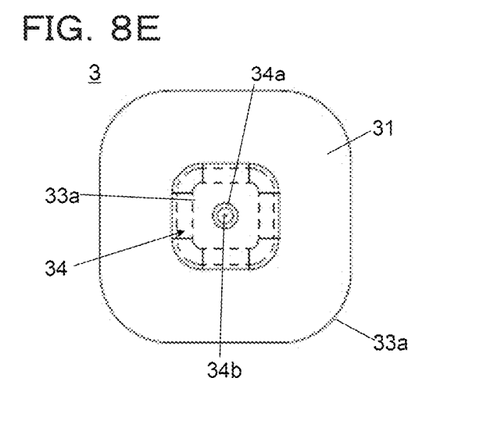
FIG. 8E is a plan view.
Figure 8F:
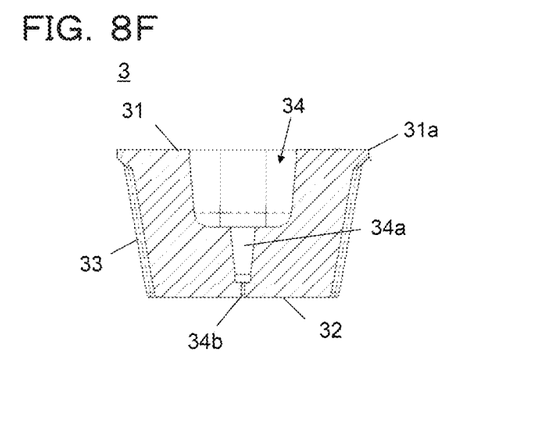
FIG. 8F is a side sectional view.

As shown in FIG. 7A, in the fitting concave 25 at the center thereof, the fitting convex 26 is formed, which is fitted with the fitting concave 34 formed on the top surface of the leg 3 (see FIG. 8A and FIG. 8F). The fitting convex 26 is a trapezoidal protrusion whose top portion is slightly smaller than the bottom portion, and the vertical grooves 27 are formed on the four side surfaces thereof, and also the ventilation grooves 28 are formed on the bottom surface of the fitting concave 25 radially from the convex 26 at the center. In this example, the ventilation grooves 28 are formed so as to extend in eight directions around the fitting convex 26. Further, the longitudinal grooves 27 formed on the four side surfaces of the fitting convex 26 are connected to the ventilation groove 28 on the bottom surface of the fitting concave 25.

Figure 7B:
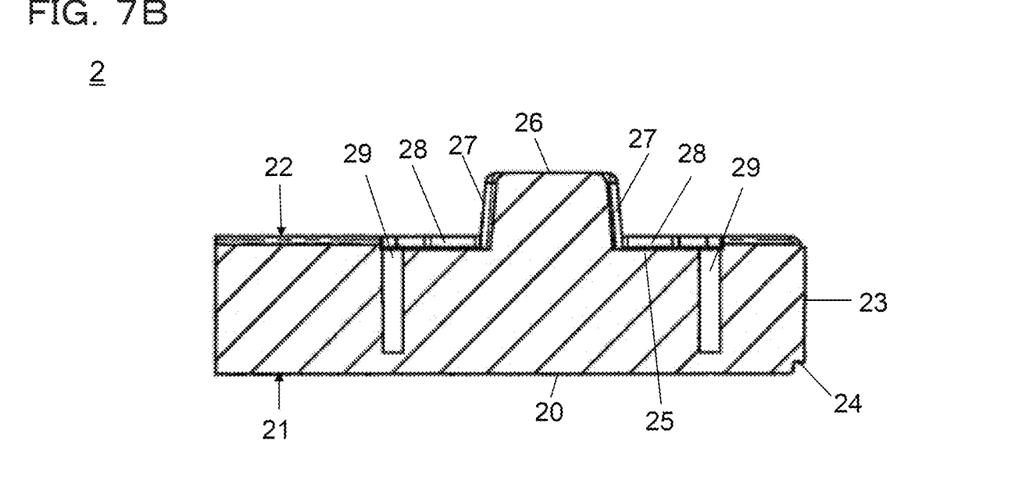
FIG. 7B is a sectional view taken along the line E-E in FIG. 7A.

Also, the plurality of exhaust holes 29 carved in the thickness direction of the pallet body are made on the bottom surface of the fitting concave 25. The exhaust holes 29 are provided at the outer periphery of the ventilation grooves 28 at the periphery of the fitting concave 25. As shown in FIG. 7B, the exhaust holes 29 does not penetrate to the top surface 21 of the pallet body 2, and a predetermined thickness is ensured from the bottom of the exhaust holes 29 to the top surface 21 of the pallet body 2. The thickness is preferably 5 mm or more, and particularly preferably 5 to 15 mm, for example. However, for the vacuum-forming processing of the resin sheet 4 described later, the thickness is desirably 15 mm or less.

As shown in FIG. 8A to FIG. 8F, the leg 3 includes the joint surface 31 joined to the pallet body 2, the installation surface 32 serving as a bottom surface when the pallet 1 is placed, and the side surface 33 distributed between the joint surface 31 and the installation surface 32. In the leg 3 of this embodiment, the joint surface 31 and the installation surface 32 have a substantially rectangular shape in plan view, and the leg 3 has a block shape with four side surfaces 33. The four side surfaces 33 have the same shape, and only one side surface is shown in FIG. 8D.

The leg 3 is formed so that the joint surface 31 is slightly larger than the installation surface 32, and the side surface 33 between them is slightly inclined. The joint surface 31 has the flange 31a that slightly extends outward. The flange 31a is fitted into the fitting concave 25 of the pallet body 2, and the bottom surface 22 of the pallet body 2 and the side surface 33 of the leg 3 are connected to the flange 31a at a moderate angle. Moreover, the flange 31a has the thin part 31b with slightly thin thickness at the location where the flange 31a faces the ventilation groove 28 in planar view.

The joint surface 31 of the leg 3 is provided with the fitting concave 34 into which the fitting convex 26 of the pallet body 2 is fitted. The fitting concave 34 is formed so that its inner dimension is substantially equal to the outer dimension of the fitting convex 26 of the pallet body 2. The fitting concave 34 is formed so that its depth is deeper than the height of the fitting convex 26. In the bottom of the fitting concave 34, the round hole 34a is formed, and further the needle hole 34b penetrating to the installation surface 32 of the leg 3 is formed in the bottom of the round hole 34a. Therefore, the fitting concave 34 communicates with the outside, namely, the installation surface 32 side of the leg 3 through the round hole 34a and the needle hole 34b. Further, when the leg 3 is attached to the pallet body 2, the fitting concave 34 communicates also with the exhaust holes 29 through the vertical grooves 27 on the four side surfaces of the fitting convex 26 and the ventilation grooves 28 on the bottom surface of the fitting concave 25.

The height of the side surface 33 of the leg 3 is designed so that the raised amount of the loading surface 20 becomes a desired value. In addition, a plurality of ribs 33a are formed in the side surface 33 in the vertical direction to improve strength. It should be noted that on the installation surface 32 of the leg 3 except for the vicinity of the needle hole 34b, a cover or the like (not shown) made of curable resin, wood, metal etc. may be attached in order to prevent the deterioration of the foamed polystyrene and the generation of debris due to a plurality of conveyances using a forklift. In addition, the leg 3 is not limited to the illustrated shape, and may be, for example, an elliptical column shape or a polygonal column shape other than such a quadrangular column.

The resin sheet 4 is a sheet member that is softened and deformed by heating, cured at room temperature, and has sufficient strength and surface durability against a heavy object placed thereon. As the material of the resin sheet 4 of the present embodiment, a resin material made of the same compound as the pallet body 2 is preferably used. When the pallet body 2 and the legs 3 are made of the above-mentioned expanded polystyrene, for example, a high-impact polystyrene (HIPS) sheet is used as the resin sheet 4.

Figure 9A:
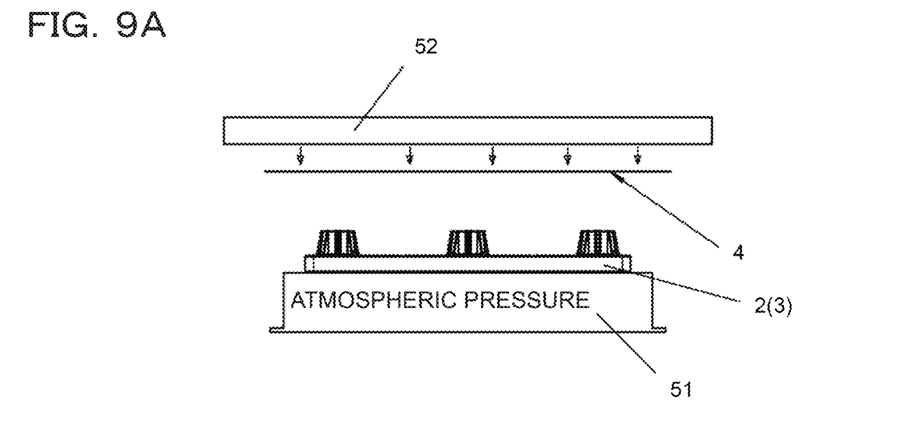
FIG. 9A to FIG. 9D are side views for explaining processes of a vacuum-forming of a resin sheet on the pallet.
Figure 9B:
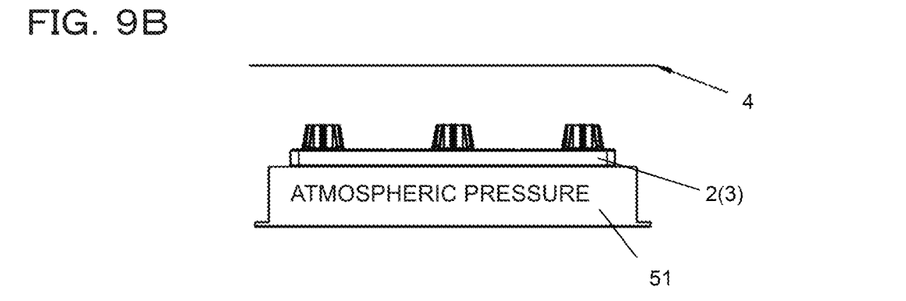
Figure 9C:
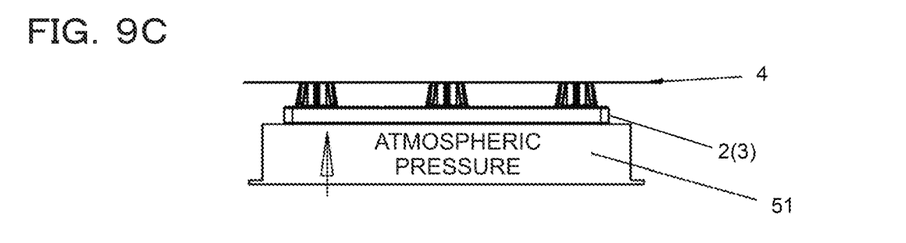
Figure 9D:
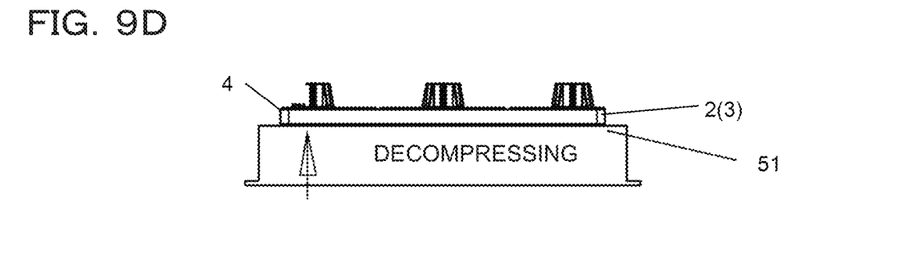

In the pallet 1 of this embodiment, the procedure, for integrally forming the resin sheet 4 on the pallet body 2, will be described with reference to FIG. 9 and FIG. 10. First, as shown in FIG. 9A, a pallet body 2 molded into a predetermined shape is prepared. The pallet body 2 is provided with legs 3. Next, the pallet body 2 is placed on the top surface of the vacuum chamber 51 so that the bottom surface 22 with the legs 3 faces upward and the top surface 21 having the loading surface 20 faces downward, and then the resin sheet 4 is placed thereon. The heater 52 is disposed above the resin sheet 4, and the heater 52 heats the resin sheet 4 to soften the resin sheet 4.

The vacuum chamber 51 is movable upward with the pallet body 2 placed thereon. As shown in FIG. 9B and FIG. 9C, when the resin sheet 4 is softened, the heater 52 is retracted and the vacuum chamber 51 (upper table) is pulled up to bring the pallet body 2 and the resin sheet 4 into contact. The vacuum chamber 51 is provided with suction ports (not shown) communicating between the internal space of the vacuum chamber 51 and the outside on the top surface side of the vacuum chamber 51, and a vacuum pump for decompressing the internal space. When the vacuum chamber 51 brings the pallet body 2 into close contact with the softened resin sheet 4, the vacuum pump is operated, as shown in FIG. 9D, to evacuate the air between the pallet body 2 and the resin sheet 4, and the resin sheet 4 is vacuum-adsorbed to the pallet body 2.

Figure 10A:
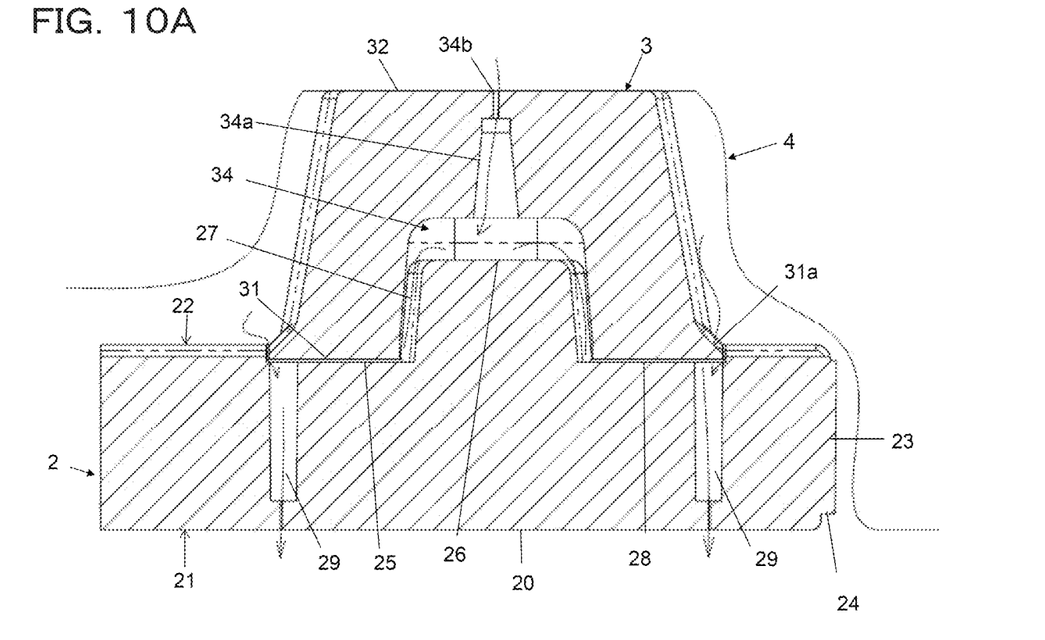
FIG. 10A is a partial cross-sectional view for explaining, in the vacuum-forming of the resin sheet, the function of exhaust holes made in the pallet body.
Figure 10B:
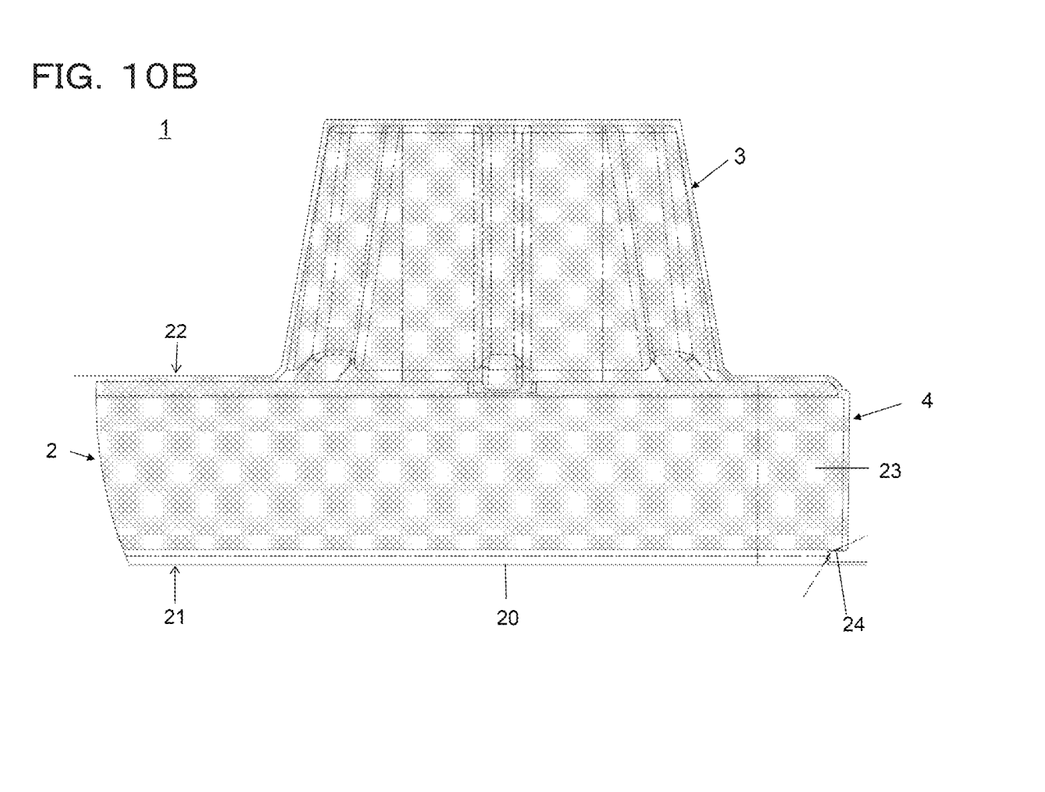
FIG. 10B is a partial side view.

As shown in FIG. 10A, the pallet body 2 is provided with the exhaust holes 29. The exhaust holes 29 can communicate with the fitting concave 34 of the leg 3 through the ventilation grooves 28 and the vertical grooves 27, and the fitting concave 34 is connected to the outside of the installation surface 32 of the leg 3 through the round hole 34a and the needle hole 34b. Although the exhaust hole 29 does not penetrate the top surface 21 of the pallet body 2, the exhaust hole 29 can effectively communicate with the outside of the top surface 21 of the pallet body 2 through slight gaps between the foamed beads because the thickness of that portion is thin. Therefore, when the vacuum chamber 51 is operated to evacuate air from the top surface 21 side of the pallet body 2 so as to decompress, the air between the top surface 21 of the pallet body 2 and the legs 3 and the resin sheet 4 placed thereon is evacuated through the needle hole 34b, the round hole 34a, the fitting concave 34, the vertical grooves 27, the ventilation grooves 28, and the exhaust holes 29. Also, since the thin portion 31b of the flange 31a of the leg 3 is thin, the air between the pallet body 2 and the resin sheet 4 is exhausted through this thin portion, the ventilation grooves 28, and the exhaust hole 29.

Thereby, the top surface 21, the side surface 23, and the outer surface of the legs 3 of the pallet body 2 are covered with the resin sheet 4 without any gap. Further, the resin sheet 4 is not coated on the loading surface 20, which is in contact with the upper table of the vacuum chamber 51, however since the step portion 24 is slightly separated with space from the upper table of the vacuum chamber 51, the resin sheet 4 can enter the space and the step portion 24 is also covered with the resin sheet 4.

Subsequently, the operation of the vacuum chamber 51 is stopped, the pallet body 2 and others are returned to atmospheric pressure, and the pallet 1 covered with the resin sheet 4 is removed from the top the vacuum chamber 51. At this time, as shown in FIG. 10B, the portion of the resin sheet 4 covering the step portion 24 is stretched, and the sheet thickness of that portion is reduced. Finally, a knife or the like is inserted into the gap between the step portion 24 and the loading surface 20, and the remaining resin sheet 4 is trimmed. In this trimming, since the sheet thickness of the resin sheet 4 where the knife is inserted is thin, trimming can be easily performed. Moreover, since the ridge line part between the step portion 24 and the loading surface 20 is chamfered so as to be a curved surface, it is easy to insert a knife. Thus, a pallet 1 can be obtained, in which the bottom surface 22 of the pallet body 2, the outer surface of the leg 3, the side surface 23 and the step portion 24 of the pallet body 2 are covered with the resin sheet 4, and the loading surface 20 is not covered with the resin sheet 4.

In the pallet 1 configured as described above, since the pallet body 2 constituting the main body is made of foamed resin, it is lightweight, and since the resin sheet 4 is integrally formed on the bottom surface side of the pallet 1 by vacuum-forming, compared with the foamed resin constituting the main body 2, more surface durability can be obtained. Particularly, following surfaces are vulnerable to damage: the surface, among the bottom surface 22 of the pallet body 2, located between the legs 3 into which a fork is inserted; the installation surface 32 of the legs 3, which is placed on a hard installation place such as concrete or asphalt; and the side surface 23 of the pallet body 2 having many opportunities to come into contact with walls and other structures. However, since those surfaces are covered with the resin sheet 4 in the pallet 1, the resin sheet 4 can reduce the damage of those places and ensure the strength of the outer surface.

Further, the pallet 1 is covered with the resin sheet 4 up to the step portion 24 on the top surface 21 side of the pallet body 2. That is, the resin sheet 4 is wound up to the part of the top surface 21 of the pallet body 2, and therefore, for example, as compared with the case where the resin sheet 4 covers only the bottom surface 22 of the pallet body 2 and the legs 3 or at most up to the side surface 23 of the pallet body 2, the resin sheet 4 is hardly peeled off and the durability of the pallet 1 can be improved. Furthermore, since the resin sheet 4 covers only up to the step portion 24 step-downed from the loading surface 20, as the results, for example, the goods-conveyed placed on the loading surface 20 are prevented from coming into contact with the edge of the resin sheet 4, and so the peeling of the resin sheet 4 can be further effectively prevented.

As a matter of fact, the resin sheet 4 has higher thermal conductivity than the foamed beads, and therefore heat is easily transferred to the goods-conveyed directly contacting with the resin sheet 4. Therefore, if both the top surface 21 and the bottom surface 22 of the pallet body 2 are covered with the resin sheet 4 (in the case of a so-called full-laminated type), compared to those not covered with the resin sheet 4, there is a possibility that the advantageous function such as thermal insulation performance and cushioning property inherent to the foamed resin cannot be fully exhibited. On the other hand, in the pallet 1 of this embodiment, the loading surface 20 is not covered with the resin sheet 4, so the pallet 1 is of half-laminated type, and the loading surface 20 is an exposed surface of the foamed resin (made of foamed beads) which has thermal insulation performance and cushioning property and forms the pallet body 2. Therefore, the pallet 1 can ensure high thermal insulation performance that makes it difficult for heat from the road surface or the warehouse floor, etc. to be transferred to the goods-conveyed placed on the pallet 1, and the cushioning property unique to the foamed resin can ensure protection for the goods-conveyed against heat and shock during conveyance. Therefore, it is possible to obtain the pallet 1 having excellent thermal insulation performance and cushioning property with respect to the placed goods-conveyed while ensuring the strength of the outer surface of the pallet.

Further, since the pallet 1 is provided with exhaust holes 29 at the positions where the legs 3 are arranged on the bottom surface 22 of the pallet body 2, after the resin sheet 4 is formed for covering, the exhaust holes 29 can be hidden. Moreover, since the exhaust holes 29 are provided at the peripheral edge of the fitting concave 25, the decompressing effect around the flange 31a of the leg 3 becomes high, and the resin sheet 4 is more strongly stuck thereto, and the legs 3 and the pallet body 2 can be more firmly fixed. Furthermore, since the exhaust holes 29 do not penetrate to the top surface 21 of the pallet body 2, any large concave is not formed on the loading surface 20, and damage to the loading surface 20 can be suppressed.

It should be noted that the present invention is not limited to the configuration of the above embodiment, and various modifications can be made without departing from the spirit of the invention. Moreover, in the above described embodiment, although the structure of the pallet 1 applies to the example of the conveyance of the goods using the forklift, it is not excluded to apply to another structure made of foamed synthetic resin. Moreover, in the above described embodiment, although the pallet 1 shown is one suitably used with a forklift, however, for example, a pallet of floor-standing type or self-moving type with casters on the bottom surface of the pallet body 2 may be included.

EXPLANATIONS OF LETTERS OR NUMERALS

1 Pallet
2 Pallet body
20 Loading surface
21 Top surface
22 Bottom surface
23 Side surface
24 Step portion
25 Fitting concave
29 Exhaust hole
3 Leg
4 Resin sheet

The invention claimed is:
1. A pallet comprising:
a pallet body in a thin rectangular shape made of foamed resin;
a plurality of legs provided on a bottom surface of the pallet body; and a resin sheet integrated by vacuum-forming from the bottom surface side of the pallet, wherein a top surface of the pallet body has a loading surface on which goods-conveyed is placed, and a step portion formed in a shape down-step from the outer peripheral edge of the loading surface to the side surface of the pallet body, and the resin sheet covers the bottom surface of the pallet body, the legs, the side surfaces of the pallet body and the step portion, and the loading surface is not covered with the resin sheet.

2. The pallet according to claim 1, wherein the resin sheet has a thin sheet thickness at a portion covering the step portion.

3. The pallet according to claim 1, wherein the pallet body and the legs are molded as separate bodies, and the bottom surface of the pallet body has an exhaust hole made in a thickness direction of the pallet body at a place where the leg is arranged.

4. The pallet according to claim 3, wherein the bottom surface of the pallet body has a fitting concave into which the leg is fitted, and the exhaust hole is provided at a peripheral edge of the fitting concave.

5. The pallet according to claim 3, wherein the exhaust hole does not penetrate to the top surface of the pallet body, and a thickness of 5 mm or more is provided from a bottom of the exhaust hole to the top surface of the pallet body.

6. The pallet according to claim 1, wherein a ridge line portion between the step portion and the loading surface is chamfered to be a curved surface.

7. The pallet according to claim 1, wherein the loading surface is an exposed surface of the foamed resin forming the pallet body and having a thermal insulation performance and a cushioning property.

* * * * *